(12) United States Patent  (10) Patent No.: US 7,586,700 B2
Azegami et al.  (45) Date of Patent: Sep. 8, 2009

(54) METHOD FOR ADJUSTING OPTICAL AXIS OF IMAGING OPTICAL SYSTEM AND LENS SYSTEM

(75) Inventors: Kazuyoshi Azegami, Saitama (JP); Satoru Horikoshi, Saitama (JP); Yusuke Suzuki, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 85 days.

(21) Appl. No.: 11/892,396

(22) Filed: Aug. 22, 2007

(65) Prior Publication Data
US 2008/0174888 A1 Jul. 24, 2008

(30) Foreign Application Priority Data
Aug. 23, 2006 (JP) ............................ P 2006-226710

(51) Int. Cl.
G02B 7/02 (2006.01)

(52) U.S. Cl. ..................... 359/823; 359/811; 359/819
(58) Field of Classification Search ......... 359/811–823, 359/826–830
See application file for complete search history.

(56) References Cited

U.S. PATENT DOCUMENTS 7,239,460 B2 * 7/2007 Yagyu et al. ................ 359/811

FOREIGN PATENT DOCUMENTS

| JP | 2005-148663 A | 6/2005 |
| JP | 2006-091406 A | 4/2006 |
| JP | 2006-091407 A | 4/2006 |
| JP | 2006-201690 A | 8/2006 |

* cited by examiner

*Primary Examiner*—Mohammed Hasan
(74) *Attorney, Agent, or Firm*—Birch, Stewart, Kolasch & Birch, LLP

(57) ABSTRACT

A method for adjusting an optical axis of an imaging optical system is provided. The imaging optical system includes: a first lens element; a right-angle prism; and a lens group, and is incorporated in a lens barrel including: a first holding member positioning and fixing the first lens and the right-angle prism; and a second holding member incorporating the lens group. The method includes: when assembling the first holding member and the second holding member, positioning the first holding member relative to the second holding member; making inspection light incident into the first lens; and changing a relative position of the first holding member to the second holding member so that an image obtained from the inspection light takes a reference position, so as to coincide an optical axis of the subject light emerged from the right-angle prism with an optical axis of the lens group.

7 Claims, 7 Drawing Sheets

METHOD FOR ADJUSTING OPTICAL AXIS OF IMAGING OPTICAL SYSTEM AND LENS SYSTEM

BACKGROUND OF THE INVENTION

1. Field of the Invention

The present invention relates to a method for adjusting an optical axis of an imaging optical system for use in an electronic still camera, a video camera and a silver halide camera, and an lens system.

2. Description of Related Art

Among cameras which are propagated generally there are so-called digital cameras which are cameras in which a subject image captured by an imaging optical system is sensed by an image sensing unit such as a CCD image sensor. In recent years, miniaturized or streamlined digital cameras constitute a main stream of the design of such digital cameras. As imaging optical systems for use in these digital cameras, there is raised a so-called refractive optical system in which subject light taken to follow a first optical axis is bent, by the use of a prism and a mirror, toward a second optical axis which intersects the first optical axis at right angles, so that the subject light bent forms an image or is focused on a focal plane of a CCD image sensor disposed on the second optical axis. Among these refractive optical systems, there is provided a refractive optical system in which a lens group which contributes to zooming is moved by a drive source to change the zooming magnification.

Since optical components which constitute a refractive optical system like this are incorporated in a camera main body as a single unit, it is general practice that these optical components are incorporated in the same lens barrel. In the case of the refractive optical system in which the lens group which makes up the optical components is moved so as to change the zooming magnification, however, since assembling and adjusting in association with assembly of the lens group which moves when changing the zooming magnification is difficult, the optical performance of the whole refractive optical system is difficult to be maintained with high accuracy. In recent years, digital cameras provided with refractive optical systems having high zooming magnifications tend to constitute the main stream of trend of digital cameras, and as the zooming magnification is increased, maintaining the optical performance of the refractive optical system with high accuracy gets more difficult.

As a method for increasing the optical performance of the refractive optical system, there is proposed a method in which a lens barrel is made up of, for example, a cover in which a prism is incorporated and an outer barrel in which the other optical components are incorporated, and a shaft portion which protrudes from a total reflection surface of the prism is passed through a passage hole provided in the cover, so that the angle of a light incident surface of the prism is adjusted by operating rotationally the shaft portion which protrudes from an external part of the cover, so as to increase the accuracy of the optical performance of the whole refractive optical system (JP-A-2005-148663 and the like).

However, adjusting the angle of the light incident surface of the prism is premised on the fact that the direction of an optical axis of light that emerges from an light emerging surface of the prism coincides with the direction of an optical axis of the optical components that are incorporated in the outer frame, and in case the assembling accuracy of the outer barrel to the cover is low, the assembling accuracy of the cover to the prism is low or the assembling accuracy of the optical components which are assembled on to the outer barrel is low, the accuracy of the optical performance of the whole refractive optical system cannot be increased only by adjusting the angle of the light incident surface of the prism as described above.

SUMMARY OF THE INVENTION

An object of an illustrative, non-limiting embodiment of the present invention is to provide a method for adjusting an optical axis of an imaging optical system, which can increase the accuracy of the optical performance of the whole refractive optical system by facilitating the adjustment of the optical axes of the prism and the other optical components which make up the refractive optical system, and to provide a lens system.

According to an aspect of the invention, there is provided a method for adjusting an optical axis of an imaging optical system which includes a first lens element, a right-angle prism for bending subject light entered from the first lens at right angles, and a lens group which moves in a direction of an optical axis of the subject light emerged from the right-angle prism, wherein these constituent components of the imaging optical system are incorporated in a lens barrel including a first holding member in which the first lens and the right-angle prism are positioned and fixed and a second holding member in which the lens group is incorporated. When assembling the first holding member in which the first lens and the right-angle prism are positioned and fixed and the second holding member in which the lens group is incorporated, inspection light is made to enter the first lens after the first holding member is positioned relative to the second holding member, and an optical axis of the subject light emerged from the right-angle prism fixed to the first holding member is made to coincide with an optical axis of the lens group incorporated in the second holding member by changing a relative position of the first holding member to the second holding member so that the position of an image obtained from the inspection light that has sequentially passed through the first lens, the right-angle prism and the lens group in this order takes a reference position.

In addition, the lens barrel may include an adjusting mechanism for adjusting the relative position of the first holding member to the second holding member, and the adjusting mechanism is made up of a plurality of adjusting screws provided at one of the first holding member and the second holding member and threaded portions provided on the other so that the plurality of adjusting screws are screwed thereinto, respectively. The optical axis of the subject light emerged from the right-angle prism and the optical axis of the lens group incorporated in the second holding member can be adjusted so as to coincide with each other by changing a relative distance of a head portion of one of the plurality of adjusting screws to its mating threaded portion.

Additionally, the adjusting mechanism may include a looseness preventive member which is provided between the head portion of one of the adjusting screw and the corresponding one of the threaded portions.

According to an aspect the invention, there is provided a lens system including: an imaging optical system including a first lens element, a right-angle prism for bending subject light entered from the first lens at right angles, and a lens group which moves in the direction of an optical axis of the subject light emerged from the right-angle prism; and a lens barrel in which the imaging optical system is incorporated, the lens barrel including a first holding member in which the first lens and the right-angle prism are positioned and fixed, a second holding member in which the lens group is incorporated, and an adjusting mechanism for adjusting a relative position of the first holding member to the second holding member. The first holding member is secured to the second holding member after the adjusting mechanism adjusts the relative position of the first holding member to the second holding member and adjusts an optical axis of the subject light emerged from the right-angle prism to coincide with an optical axis of the lens group incorporated in the second holding member.

BRIEF DESCRIPTION OF THE DRAWINGS

The features of the invention will appear more fully upon consideration of the exemplary embodiment of the invention, which are schematically set forth in the drawings, in which.

DETAILED DESCRIPTION OF THE EXEMPLARY EMBODIMENTS

Although the invention will be described below with reference to the exemplary embodiments thereof, the following exemplary embodiments and modifications do not restrict the invention.

According to an exemplary embodiment of the invention, the high accuracy of the optical performance of the whole imaging optical system can be increased. In addition, it becomes possible to eliminate a deviation of the optical axis of the light emerged from the right-angle prism from the optical axis of the lens group, as well as a deviation of the light emerged from the light emerging surface from the direction of the optical axis.

According to a lens system of an exemplary embodiment of the invention, the optical performance of an imaging optical system in the lens system is maintained with high accuracy.

Description will be given below in detail of an imaging lens according to exemplary embodiments of the invention with reference to the accompanying drawings.

Figure 1:
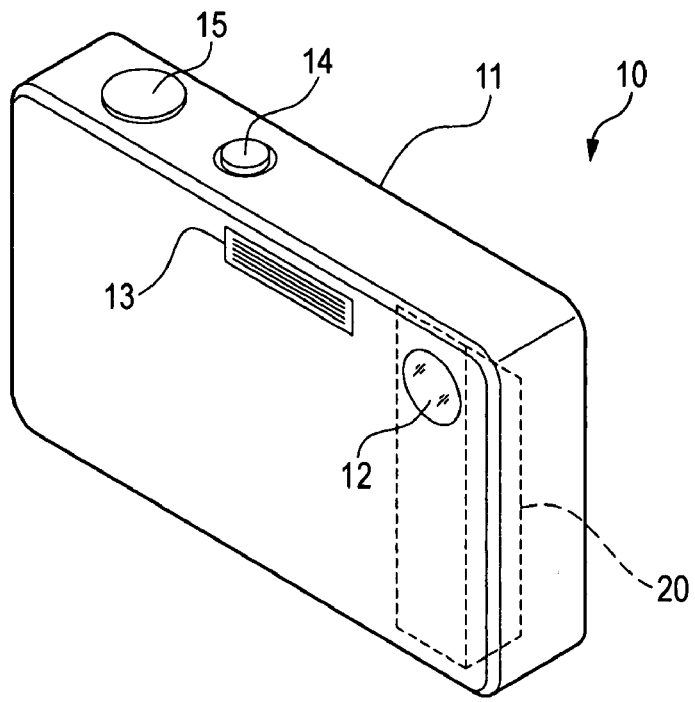
FIG. 1 is a perspective view showing an external appearance of a front side of a digital camera.
Figure 2:
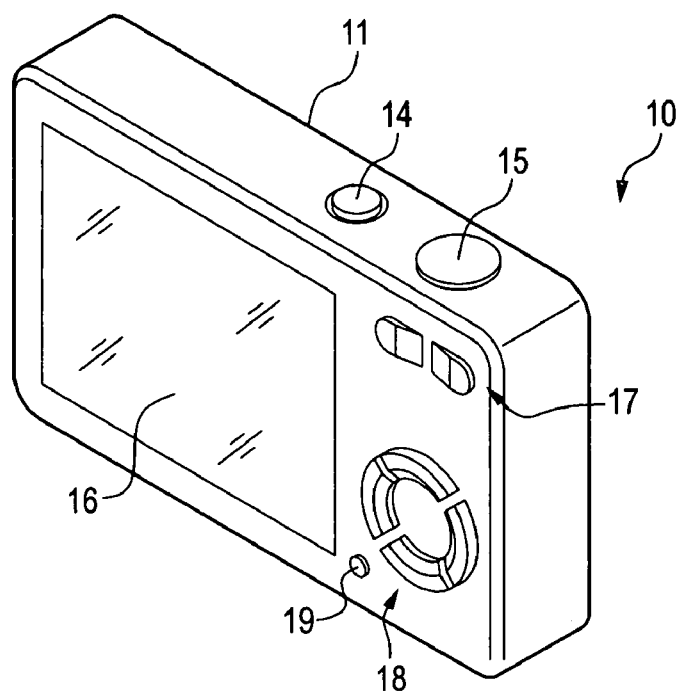
FIG. 2 is a perspective view showing an external appearance of a back side of the digital camera.

A digital camera 10 shown in FIGS. 1 and 2 has an imaging opening 12 and a flash light emitting portion 13 provided on a front side, as well as a power supply button 14 and a shutter button 15 provided on a top side of a camera main body 11.

There are provided on a back side of the camera main body 11 are an LCD (Liquid Crystal Display) screen 16, a zoom control button 17, a cursor button 18 and a mode switching button 19. The mode switching button 19 is manipulated by the user when he or she attempts to switch the mode of the camera between an imaging mode for recording a captured image on a memory card, a reproduction mode for reproducing for review the image recorded on the memory card, and a setup mode for setting up various operations.

The LCD screen 16 is used for reproducing the images for review, and in addition to this, the LCD screen 16 functions as an electronic viewfinder where a through image for framing is displayed when the imaging mode is in effect. In addition, when the setup mode is put in effect, the LCD screen 16 displays a menu screen. The cursor button 18 is manipulated to move a cursor on the menu screen, as well as select items displayed on the menu screen. The zoom control button 17 is operated to change the zooming magnification.

Figure 3:
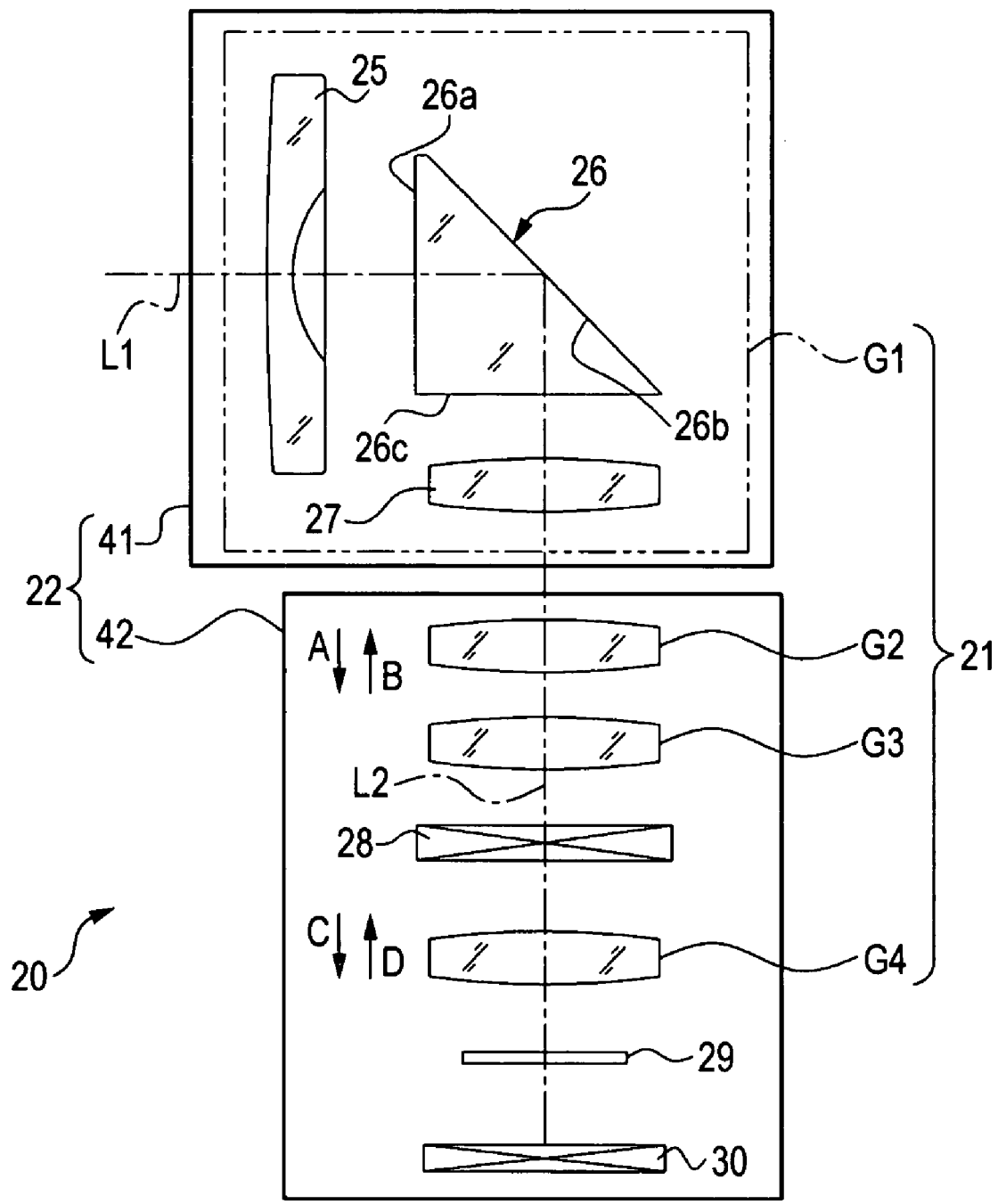
FIG. 3 is a schematic diagram showing the configuration of a lens system.

FIG. 3 is a schematic diagram showing the configuration of a lens system 20 which is built into the digital camera 10. The lens system 20 includes an imaging optical system 21 and a lens barrel which holds the imaging optical system 21. The imaging optical system 21 is made up of a first lens group G1, a second lens group G2, a third lens group G4 and a fourth lens group G4. In addition, the imaging optical system 21 is made up of a so-called refractive optical system in which a right-angle prism 26 is provided in the first lens group G1. Note that although this will be described in detail later on, the first lens group G1 which makes up the imaging optical system 21 is positioned and fixed in a prism holding frame (the first holding member), while the second lens group G2, the third lens group G3 and the fourth lens group G4 are built in a lens barrel main body (the second holding member) 42.

The first lens group G1 is made up of a first lens element 25, the right-angle prism 26 and a second lens element 27. The first lens element 25 is disposed on a back side of the imaging opening 12 in such a manner as to take in subject light (light from a subject captured) to emit the light so taken in toward a light incident surface 26a of the right-angle prism 26. The right-angle prism 26 is made up of the light incident surface 26a on which the subject light is incident from the first lens element 25, a light reflecting surface 26b which bends the subject light that enters an interior of the prism from the light incident surface 26a, which has an optical axis L1, at 90° to turn the light into a subject light having now an optical axis L2, and a light emerging surface 26c from which the subject light reflected on the light reflecting surface 26b is caused to emerge. The second lens element 27 emits the subject light emerged from the right-angle prism 26 toward the second lens group G2.

The second lens group G2 is held on a lens carrier, which will be described later on, in such a manner as to be moved by a minute amount in a direction indicated by an arrow C in FIG. 3 or in a direction indicated by an arrow B in FIG. 3 so as to change the zooming magnification when capturing an image. Note that although not described in detail, this second lens group G2 may be configured so as to be made up of a single lens element or a plurality of lens elements. The third lens group G3 is provided so as to pass the subject light from the second lens group G2 to be incident on the fourth lens group G4. Note that reference numeral 28 denotes a shutter mechanism which is disposed between the third lens group G3 and the fourth lens group G4.

The fourth lens group G4 is held on a lens carrier, which will be described later on, in such a manner as to be moved by a minute amount in a direction indicated by an arrow C in FIG. 3 or in a direction indicated by an arrow D in FIG. 3 so as to adjust the focal length of the lens system. After having passed through a low-pass filter 29, the subject light emerged from the fourth lens group G4 is focused on a focal plane of a CCD image sensor 30. Note that the low-pass filter 29 is provided to prevent the occurrence of moire or false color.

Figure 4:
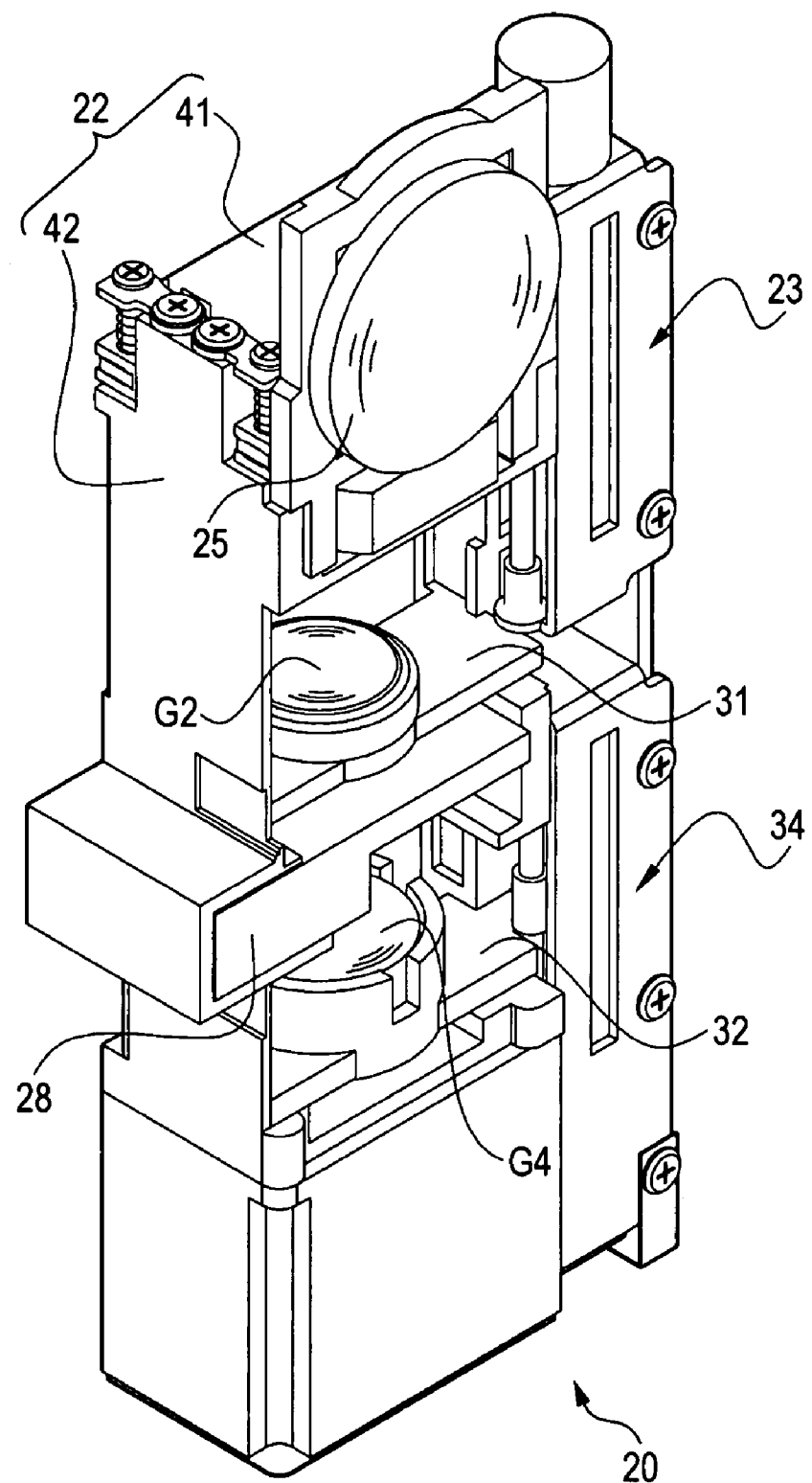
FIG. 4 is a perspective view showing an external appearance of the lens system.

As is shown in FIG. 4, a lens barrel 22 is formed substantially into a cylindrical shape, and the imaging optical system 21, the shutter mechanism 28, the low-pass filter 29 and the CCD image sensor 30 are built in a hollow space defined in an interior of the lens barrel 22, and in addition to them, drive units 33, 34 for moving a lens carrier 31 which holds the second lens group G2 and a lens carrier 32 which holds the fourth lens group G4, respectively, are built in the same hollow space.

Figure 5:
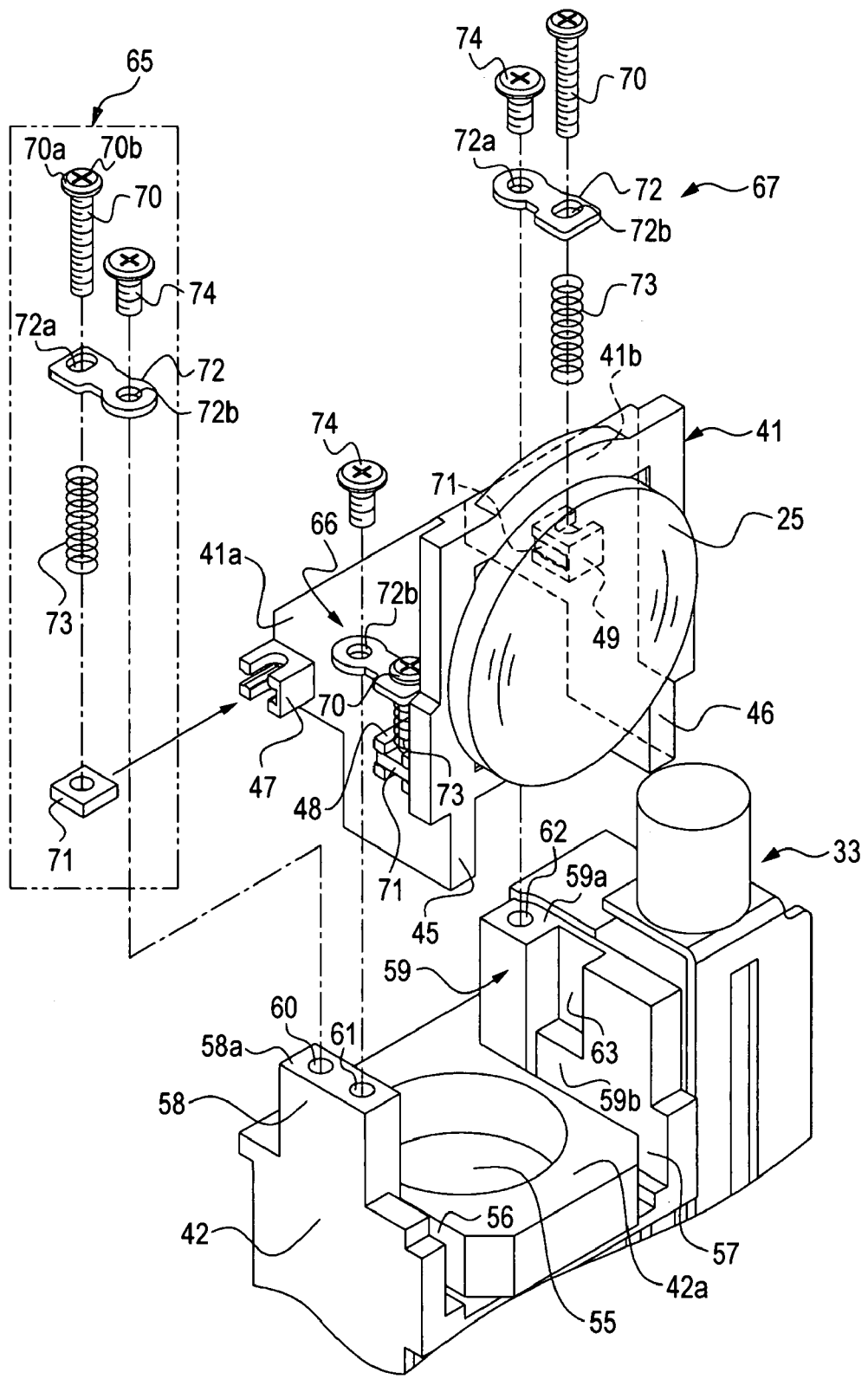
FIG. 5 is a perspective view showing a state in which a prism holding frame and a lens barrel main body are disassembled.

The lens barrel 22 is made up of a prism holding frame 41 and a lens barrel main body 42. In the prism holding frame 41, the first lens group G1 is positioned and fixed as has been described before. As is shown in FIG. 5, positioning pieces 45, 46 are provided at a lower portion of the prism holding frame 41 and are inserted respectively into guide grooves 56, 57 provided on an upper side of the lens barrel main body 42 when the prism holding frame 41 is assembled to the lens barrel main body 42. In addition, nut holding portions 47, 48 for holding nuts are provided on a side 41b of the prism holding frame 41. Similarly, a nut holding portion 49 is provided on a side 41b of the prism holding frame 41.

The second lens group G2 to the fourth lens group G4 and the shutter mechanism 28, the low-pass filter 29, the CCD image sensor 30 and the like are assembled to the lens barrel main body 42. An opening 55 is provided in the upper side 42a of the lens barrel main body 42 which passes the light which has emerged from the first lens group G1, and the guide gropes 56, 57 are formed on outer sides of this opening 55. In addition, fixing portions 58, 59 are provided on outer sides of the guide grooves 56, 57, respectively, in such a manner as to erect therefrom so that fastening plates 72, which will be described later on, are fixed thereto, respectively. Threaded holes 60, 61 are provided on an upper side 58a of the fixing portion 58 into which fixing screws 74 for fixing respectively fastening plates 72 of optical axis adjusting mechanisms 65, 66 are screwed. In addition, a threaded hole 62 is provided on an upper side 59a of the fixing portion 59 into which a fixing screw 74 for fixing a fastening plate 72 of an optical axis adjusting mechanism 67 is screwed. Additionally, an insertion recess portion 63 is provided on a side 59b of the fixing portion 59 into which the nut holding portion 49 which is provided on the side 41b of the prism holding frame 41 is inserted.

The three optical axis adjusting mechanisms 65, 66, 67 are provided on this lens barrel 22 for causing the direction of the optical axis of the light that has emerged from the light emerging surface of the right-angle prism 26 which is positioned and fixed in the prism holding frame 41 to coincide with the direction of the optical axis of the second lens group G2 to the fourth lens group G4 which are built in the lens barrel main body 42. Note that since the configurations of these optical axis adjustment mechanisms 65, 66, 67 are the same, only the configuration of the optical axis adjusting mechanism 65 will be described below, and in the description, like reference numerals are given to like members. This optical axis adjusting mechanism 65 is made up of an adjusting screw 70, a nut 71, the fastening plate 72 and a compression spring 73. In addition, reference numeral 74 denotes a fixing screw for fixing the fastening plate 72 to the fixing table 58 of the lens barrel main body 42 through a hole 72b.

The adjusting screw 70 is passed through an elongate hole 72 in the fastening plate 72 fixed to the fixing portion 58 and the compression spring 73 and is then screwed into the nut 71 which is held by a nut holding portion 47. A head portion 70a provided on the adjusting screw 70 has a groove 70b which is formed into, for example, a cross-like shape, and a tool such as a screw driver is inserted into the groove 70b so as to rotate the adjusting screw 70 in a direction indicated by an arrow G in FIG. 6 or in a direction indicated by an arrow I in FIG. 6. For example, since, when rotated in the direction G in FIG. 6, the adjusting screw 70 is moved in a direction (a direction indicated by an arrow H in FIG. 6) in which the adjusting nut 70 is screwed into the nut 71, a distance between the head portion 70a of the adjusting screw 70 and the nut is decreased. Note that since the head portion 70a of the adjusting screw 70 is in abutment with the fastening plate 72, the prism holding frame 41 is moved in such a manner as to be separated from the lens barrel main body 42. On the other hand, since, when rotated in the direction I in FIG. 6, the adjusting screw 70 is moved in a direction (a direction indicated by an arrow J in FIG. 6) in which the threaded engagement between the adjusting screw 70 and the nut is released, the distance between the head portion 70a of the adjusting screw 70 and the nut 71 is increased, and as a result, the prism holding frame 41 is moved toward the lens barrel main body 42.

The head portion 70a of the adjusting screw 70 is brought into abutment with the fastening plate 72, whereby the adjusting screw 70 is held in a predetermined position. In addition, one end of the compression spring 73 through which the adjusting screw 70 is passed is brought into abutment with the fastening plate 72. The compression spring 73 is brought into abutment with a lower side of the fastening plate 72 at one end and with an upper side of the holding portion 47 which holds the nut 71 at the other end thereof. The generation of looseness between the prism holding frame 41 and the lens barrel main body 42 can be prevented by the use of the compression spring 73.

Next, a creating procedure of the lens system 20 will be described. The right-angle prism 26 is positioned in the prism holding frame 41 in such a manner that with a front side of the prism holding frame 41 which is brought into abutment with the first lens element 25 made to function as a reference surface, this reference surface and the light incident surface 26a of the right-angle prism 26 becomes parallel, and the right-angle prism 26 is secured to the prism holding frame 41 by the use of an adhesive. Thereafter, the prism holding frame is secured in such a manner that the state is maintained in which the first lens element 25 is in abutment with the front side of the prism holding frame 41. Finally, the second lens element 27 is secured to the prism holding frame 41 in such a state that the second lens element 27 is in abutment with the light emerging surface 26c of the right-angle prism 26. On the other hand, the lens carrier 31 which holds the second lens group G2 and the lens carrier 32 which holds the third lens group G3 and the fourth lens group G4 are then assembled to the lens barrel main body after the positions of the lens carrier 31 and the lens carrier 32 are adjusted so that the optical axes these lens groups so held thereby coincide with each other. As this occurs, the adjusting screws 70 of the optical axis adjusting mechanisms 65, 66 are passed sequentially through the elongate holes 72a in the fastening plates 72 and the compression springs 73 in that order, respectively, and thereafter, are screwed respectively into the nuts 71 which are held by the nut holding portions 47, 48 which are provided on the side 41a of the prism holding frame 41. Similarly, the adjusting screw 70 of the optical axis adjusting mechanism 67 is passed sequentially through the elongate hole 72a in the fastening plate 72 and the compression spring 73 in that order, and thereafter, is screwed into the nut 71 which is held by the nut holding portion 49 provided on the side 41b of the prism holding frame 41.

The prism holding frame 41 in which the first lens group G1 is positioned and fixed is assembled to the lens barrel main body 42 to which the second lens group G2 to the fourth lens group G4 are assembled. After the positioning pieces 45, 46 of the prism holding frame 41 are inserted into the guide grooves 56, 57 of the lens barrel main body 42, respectively, the fastening plates 72 of the optical axis adjusting mechanisms 65, 66 are fixed to the fixing portion 58 by utilizing the fixing screws 74. Similarly, the fastening plate 72 of the optical axis adjusting mechanism 67 is fixed to the fixing portion 59 by utilizing the fixing screw 74. As a result of following the procedure like this, a so-called temporarily fixed state results in which the prism holding frame 41 is connected to the lens barrel main body 42. In addition, the prism holding frame 41 is allowed to move in a direction indicated by an arrow P in FIG. 6 or in a direction indicated by an arrow Q in FIG. 6 relative to the lens barrel main body 42 due to a fitting tolerance that is produced between the positioning pieces 45, 46 of the prism holding frame 41 and the guide grooves 56, 57 of the lens barrel main body 42.

Figure 6:
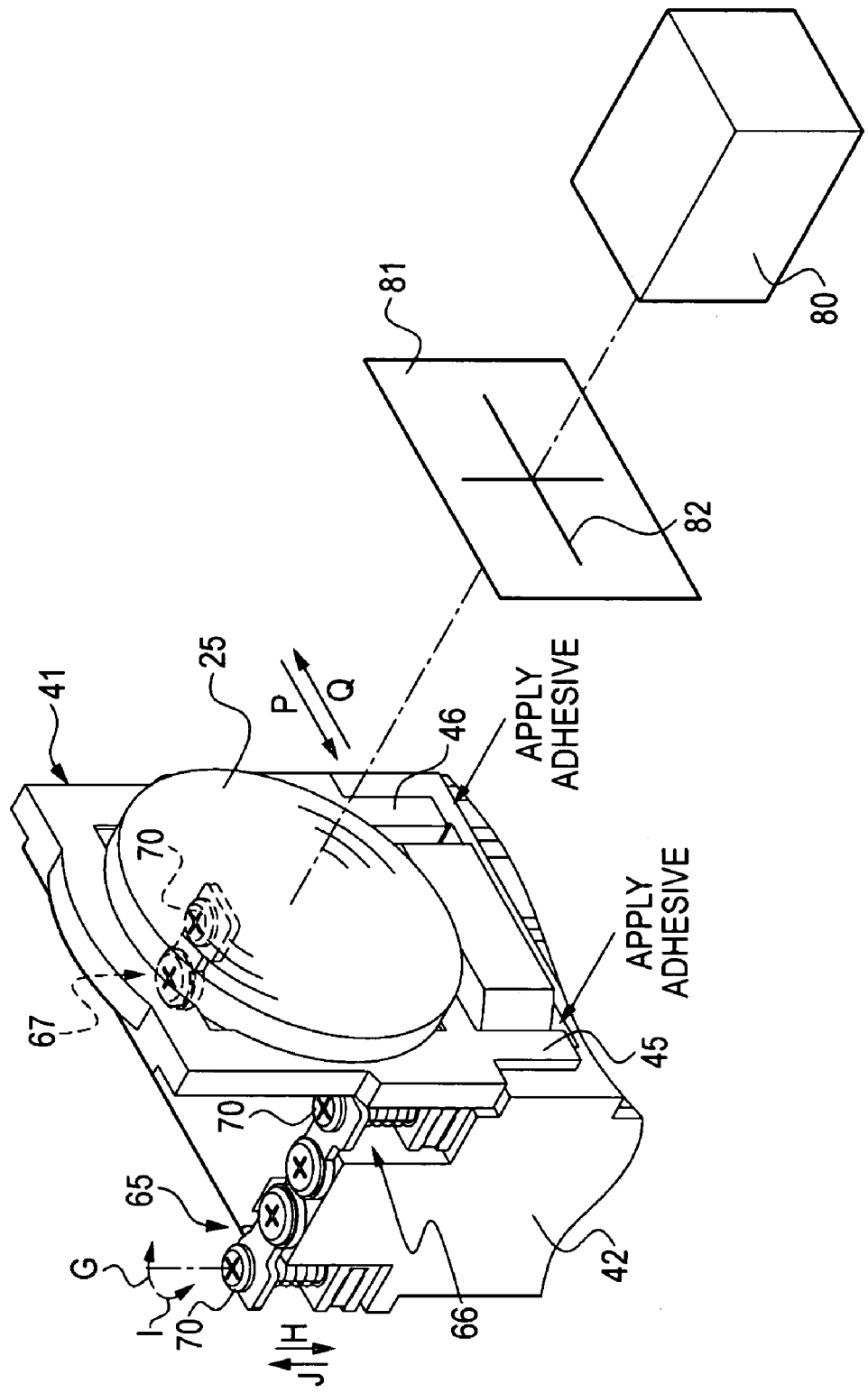
FIG. 6 is a perspective view showing an example of an optical axis adjustment of an imaging optical system.

As is shown in FIG. 6, the adjustment of the optical axis of the imaging optical system 21 will be performed as follows. After the lens barrel main body 42 to which the prism holding frame 41 is temporarily fixed is positioned properly, a light source 80 disposed on an upstream side of the first lens element 25 is illuminated, and its illumination light is shone on to a chart 81. For example, in the event that the optical axis is adjusted in such a state that the CCD image sensor 30 is not assembled to the lens barrel main body 42, the illumination light that has passed through the imaging optical system 21 is made to be projected on to a screen disposed on a downstream side of the fourth lens group G4. In addition, since a mark 82 such as "+" is shone on to the chart 81 at a center thereof, the mark 82 is projected on to the screen. In addition, in the event that the position of a mark 82 that is obtained on a lens system 20 which is actually being subject to an optical axis adjustment deviates from the position of a mark 82 resulting as a reference position when a lens system that has already been subject to an optical axis adjustment is used, the adjusting screw 70 of any of the optical axis adjusting mechanisms 65, 66, 67 is rotated in a loosening direction (the direction I in FIG. 6) or a tightening direction (the direction G in FIG. 6) so as to move the position of the mark 82 to the reference position, so that a center position of the mark 82 comes to be positioned at a central point of the screen, whereby the first lens group G1 can be adjusted with respect to the position in the direction of optical axis L2 and inclination relative to the direction of the optical axis L2.

In addition, since a deviation equal to the fitting tolerance is generated between the positioning piece 45 and the guide groove 56 and between the positioning piece 46 and the guide groove 57, respectively, a position adjustment in the direction P in FIG. 6 or in the direction Q in FIG. 6 is performed so as to enable a position adjustment in directions which intersect the optical axis L1 and the optical axis L2, respectively. In addition, as this adjustment occurs, since the compression springs 73 are disposed between the fastening plates 72 of the optical axis adjusting mechanisms 65, 66, 67 and the nut holding portions 47, 48, 49, respectively, looseness that would otherwise be produced at the time of adjustment can be prevented. In addition, after the mark 82 projected on to the screen is adjusted to come to be located in the reference position, an adhesive is applied to guide grooves 56, 57 in which the positioning pieces 47, 48 have been inserted, and the prism holding frame 41 is fixed properly to the lens barrel main body 42. Thereafter, the CCD image sensor 30 and the drive units 33, 34 are assembled to the lens barrel main body 42.

Note that the optical axis adjustment of the imaging optical system 21 can be performed after the CCD image sensor 30 and the drive units 33, 34 have been assembled to the lens barrel main body. In this case, an image read by the CCD image sensor 30 needs to be used.

While in this embodiment, the looseness or rattling of the prism holding frame 41 that would otherwise be produced at the time of adjustment is prevented by disposing the compression springs 73 between the fastening plates 72 of the optical axis adjusting mechanisms 65, 66, 67 and the nut holding portions 47, 48, 49, respectively, the invention is not limited thereto, and hence, the compression springs do not have to be used. In addition, forms of springs such as a leaf spring and an extension spring that are used in place of the compression spring are not limited by this embodiment.

While this embodiment is described as the fastening pieces being assembled to the lens barrel main body, the invention is not limited thereto, and hence, the fastening pieces can be assembled to the prism holding frame. In this case, for example, nuts and nut holding portions can be provided on the lens barrel main body.

While this embodiment is described as the adjusting screw being tightened or loosened in the direction of the optical axis L2, the invention is not limited thereof, and hence, the direction indicating the adjusting screw can be a direction which intersects the direction of the optical axis L2. In addition, instead of using the adjusting screws, the optical axis of the imaging optical system can be adjusted by adjusting the position of the prism holding frame by making use of an eccentric cam.

Figure 7:
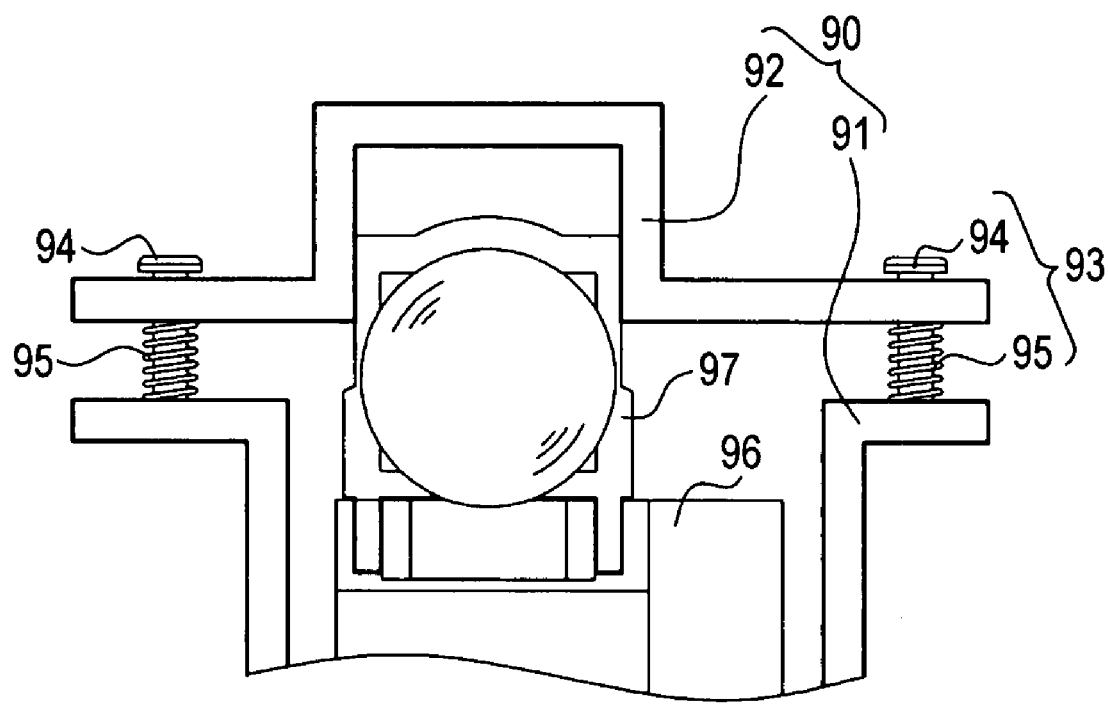
FIG. 7 is a front view showing a configuration for use when the optical axis of the imaging optical system is adjusted by utilizing a jig including an optical axis adjusting mechanism.

While this embodiment is described as the optical axis adjusting mechanisms being built in the lens barrel main body, the invention is not limited thereto. For example, the relative position of the prism holding frame to the lens barrel main body can be adjusted using a jig including optical axis adjusting mechanisms. In this case, as is shown in FIG. 7, a jig 90 is made up of a jig main body 91 and an adjusting portion 92, and a position adjusting mechanism 93 is made up of an adjusting screw 94 and a compression spring 95. A lens barrel main body 96 and a prism holding frame 97 are positioned and fixed to the jig main body 91 and the adjusting portion 92, respectively. Thereafter, the adjusting portion 92 is assembled to the jig main body 91 with a plurality of adjusting screws 94. As this occurs, a compression spring 97 is disposed between the jig main body 91 and the adjusting portion 92. Thereafter, the position of the prism holding frame 97 relative to the lens barrel main body 96 is adjusted by loosening or tightening any of the adjusting screws 94. Note that this position adjustment is performed by adjusting the position of an image obtained by projecting or reading light that has passed through the chart as in the case of the embodiment. After the position adjustment is performed properly, the lens barrel main body 96 and the prism holding frame 97 are fixed to each other using an adhesive. In this case, since the optical axis adjusting mechanisms do not have to be provided on the lens barrel, the lens system itself can be made compact in size.

While in the embodiment, the lens system results in which the lens groups are disposed on the light emerging surface side of the right-angle prism, the invention does not have to be limited thereto, and hence, a lens system may results in which lens groups are disposed on a light incident surface side of a right-angle prism.

While in the embodiment, the lens group G1 which is fixed to the prism holding frame 41 is made up of the first lens element 25, the right-angle prism 26 and the second lens element 27, the invention is not limited thereto, and hence the lens group G1 may be made up of the first lens element 25 and the right-angle prism 26.

Figure 8:
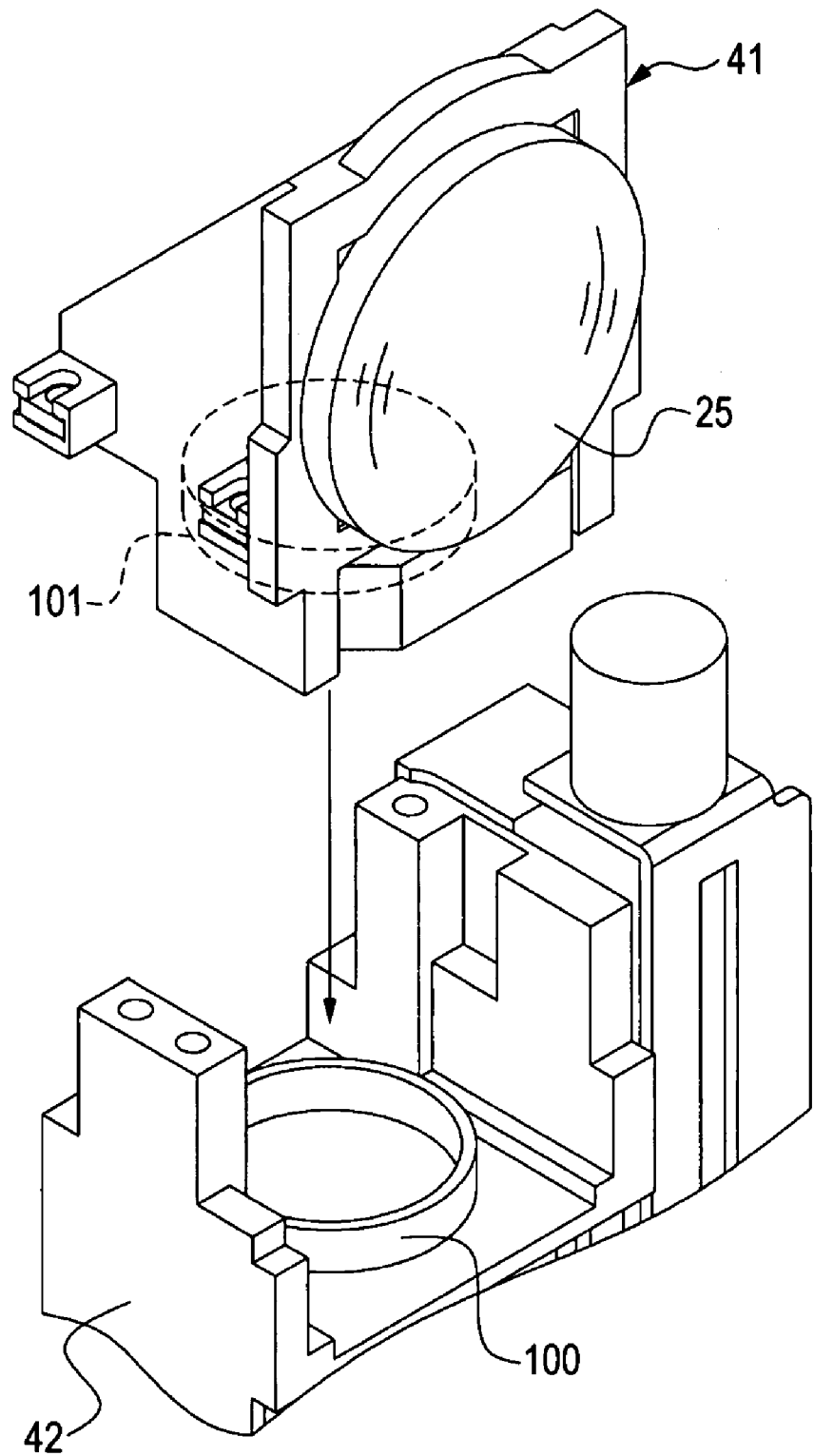
FIG. 8 is a perspective view showing a state in which a prism holding frame and a lens barrel main body are disassembled with a cylindrical portion provided on the lens barrel main body and a fitting portion adapted to be fitted in the cylindrical portion provided on the prism holding frame.

While the embodiment is described as the plate-shaped positioning pieces 45, 46 being provided on the prism holding frame 41 and the positioning pieces 45, 46 being inserted in the guide grooves 56, 57 on the lens barrel main body 42, the configuration of the positioning pieces is not limited to that described in the embodiment, and hence, as is shown in FIG. 8, a form may be adopted in which a cylindrical portion 100 is provided on a lens barrel main body 42, and a fitting portion 101 is provided on a lower side of a prism holding member 41, whereby the prism holding frame 41 is assembled to the lens barrel main body 42 by fitting the cylindrical portion 101 on the lens barrel main body 42 on the fitting portion 101 on the prism holding frame 41. In this case, since the cylindrical portion 100 and the fitting portion 101 are produced within the range of a tolerance, a looseness is to be generated between them when the prism holding frame 41 is assembled to the lens barrel main body 42. In addition, when fixing the prism holding frame 41 is fixed to the lens barrel main body 42, after the relative position thereof is adjusted by the optical axis adjusting mechanisms of the embodiment, the prism holding frame 41 is secured to the lens barrel main body 42, whereby the optical axis from the light emerging surface of the prism held by the prism holding frame 41 can be made to coincide with the optical axis of the lens group which is built in the lens barrel main body 42.

While in this embodiment, the case of the lens system which is built in the digital camera is described, in addition to this, the invention can be applied to a lens system of a digital video camera in which a refractive optical system is used in an imaging optical system.

While the invention has been described with reference to the exemplary embodiments, the technical scope of the invention is not restricted to the description of the exemplary embodiments. It is apparent to the skilled in the art that various changes or improvements can be made. It is apparent from the description of claims that the changed or improved configurations can also be included in the technical scope of the invention.

This application claims foreign priority from Japanese Patent Application No. 2006-226710, filed Aug. 23, 2006, the entire disclosure of which is herein incorporated by reference.

What is claimed is:

1. A method for adjusting an optical axis of an imaging optical system that comprises: a first lens element; a right-angle prism for bending light entered from the first lens at right angles; and a lens group that moves in a direction of an optical axis of the subject light emerged from the right-angle prism, wherein the imaging optical system is incorporated in a lens barrel, and the lens barrel comprises: a first holding member positioning and fixing the first lens and the right-angle prism; a second holding member incorporating the lens group; and an adjusting mechanism that adjusts the relative position of the first holding member with respect to the second holding member, the method comprising: when assembling the first holding member and the second holding member,
positioning the first holding member relative to the second holding member;
making inspection light incident into the first lens to pass through the first lens, the right-angle prism and the lens group in this order so that an image obtained from the inspection light takes a reference position; and
changing a relative position of the first holding member with respect to the second holding member by adjusting the adjusting mechanism so as to coincide a first optical axis of the subject light emerged from the right-angle prism fixed to the first holding member, said first optical axis corresponding to the reference position, with a second optical axis of the lens group incorporated in the second holding member.

2. The method for adjusting an optical axis of an imaging optical system according to claim 1, wherein the adjusting mechanism comprises: a plurality of adjusting screws provided at one of the first holding member and the second holding member; and a plurality of threaded portions provided at the other of the first holding member and the second holding member, the adjusting screws being screwed into the respective threaded portions, respectively, and
wherein the first optical axis of the subject light emerged from the right-angle prism and the second optical axis of the lens group are adjusted so as to coincide with each other by changing a relative distance of a head portion of one of the adjusting screws to the corresponding one of the threaded portions.

3. The method for adjusting an optical axis of an imaging optical system according to claim 2, wherein the adjusting mechanism comprises a looseness-preventive member provided between the head portion of one of the adjusting screw and the corresponding one of the threaded portions.

4. A lens system comprising:
an imaging optical system comprising a first lens element, a right-angle prism for bending subject light entered from the first lens at right angles, and a lens group that moves in a direction of a first optical axis of the subject light that emerged from the right-angle prism; and
a lens barrel in which the imaging optical system is incorporated, the lens barrel comprising: a first holding member positioning and fixing the first lens and the right-angle prism; a second holding member incorporating the lens group; and an adjusting mechanism that adjusts a relative position of the first holding member to the second holding member,
wherein the first holding member is secured to the second holding member after the adjusting mechanism adjusts the relative position of the first holding member with respect to the second holding member thereby adjusting the first optical axis of the subject light emerged from the right-angle prism so as to coincide with a second optical axis of the lens group incorporated in the second holding member.

5. The lens system according to claim 4, wherein the adjusting mechanism comprises: a plurality of adjusting screws provided at one of the first holding member and the second holding member; and a plurality of threaded portions provided at the other of the first holding member and the second holding member, the adjusting screws being screwed into the respective threaded portions, respectively, and wherein the first optical axis of the subject light emerged from the right-angle prism and the second optical axis of the lens group are adjusted so as to coincide with each other by changing a relative distance of a head portion of one of the adjusting screws to the corresponding one of the threaded portions.

6. The lens system according to claim 5, wherein the adjusting mechanism comprises a looseness-preventive member provided between the head portion of one of the adjusting screw and the corresponding one of the threaded portions.

7. The lens system according to claim 6, wherein the looseness-preventive member is a compression spring.

* * * * *